United States Patent
Pitts et al.

[11] 3,865,760
[45] Feb. 11, 1975

[54] FLAME RETARDANT MATERIALS

[75] Inventors: Frank Pitts, Kersal; Michael Hilton Clubley, Bolton, both of England

[73] Assignee: Magnesium Elektron Limited, Swinton, Manchester, England

[22] Filed: July 30, 1973

[21] Appl. No.: 383,544

[30] Foreign Application Priority Data
Aug. 7, 1972    Great Britain .................... 36726/72

[52] U.S. Cl...... 260/2.5 AJ, 106/15 FP, 117/161 R, 117/161 UH, 117/161 UZ, 117/161 KP, 117/161 K, 260/45.7 R
[51] Int. Cl. ............................................. C08c 17/08
[58] Field of Search .................. 260/45.7 R, 25 AJ; 106/15 FP; 117/161 R

[56] References Cited
UNITED STATES PATENTS
3,202,570   8/1965   Videen ............................... 162/159
3,367,863   2/1968   Cooper et al. .................. 106/15 FP

*Primary Examiner*—Melvyn I. Marquis
*Attorney, Agent, or Firm*—Karl W. Flocks

[57] ABSTRACT

A rubber or plastics composition contains a flame-retarding agent containing calcium and borate radicals. A preferred agent is a hydrated mineral such as colemanite. The agent may be used in combination with a filler such as calcium carbonate and alumina trihydrate.

10 Claims, No Drawings

FLAME RETARDANT MATERIALS

This invention relates to rubber or plastics material containing flame-retardant agents.

In the manufacture of foamed rubber or plastics material it is customary to incorporate fillers to improve the mechanical properties of the material and also to reduce its cost. Examples of fillers of this kind are calcium carbonate and china clay. One major industrial application of such materials is in the backing of carpets with foamed rubber or in producing a separate foamed rubber under-lay for use under carpets.

One serious disadvantage of such materials is that they are inflammable and once burning commences the flames spread very rapidly. It is accordingly known to incorporate flame retardants in the material and in some cases halogen-containing products, such as penta-bromo-toluene or chlorinated paraffins, have been compounded with a conventional filler such as calcium carbonate or china clay. It is also known to use zinc borate or antimony oxide in a similar manner. An alternative method of producing a foam with improved flame retardant properties is to replace the conventional filler, which itself has no significant flame retardant properties, with another filler which not only provides adequate mechanical properties but which also imparts flame retardancy. For example, it is known to use tri-hydrate of alumina in this way. Although foamed rubber compounded from rubber and tri-hydrate of alumina is substantially cheaper for a given degree of flame retardancy than that compounded from rubber, calcium carbonate (or china clay) and one of the flame retardant additives referred to above (e.g. pentabromo-toluene) it is still very costly in comparison with ordinary (non flame-retardant) foamed rubber using only calcium carbonate since this may be produced by comminution of naturally occurring limestone, a very cheap and abundantly available mineral.

According to one aspect of the present invention there is provided a rubber or plastics material containing a flame-retarding agent comprising an inorganic compound containing calcium and borate radicals. The compound is preferably a natural mineral comprising a hydrated salt.

A preferred flame-retarding agent is the naturally occurring mineral Colemanite, which is a hydrated calcium borate, $Ca_3B_6O_{11}.5H_2O$. When comminuted and incorporated into the material Colemanite also acts as a mechanical filler. Colemanite is a cheap, readily available mineral. Other minerals which may be used include ulexite, $Na_2O.CaO\ 5\ B_2O_5.\ 16\ H_2O$ and pandermite, $4\ CaO.5B_2O_5.7H_2O$.

The material may be foamed in conventional manner (e.g. foamed polyurethane) or solid (i.e., unfoamed), e.g. solid rubber.

The flame-retarding agents of the invention may be used either alone or in conjunction with other fillers and flame retardants such as calcium carbonate or tri-hydrate of alumina. A composition may be made from rubber Colemanite and penta-bromo-toluene in which case the material will be more resistant to spread of flame than if it were made from rubber and the same quantity of Colemanite only. The penta-bromo-toluene may be replaced by chlorinated paraffins or other halogen-containing flame retardant organic additives and the material will again have more resistance to spread of flame than if Colemanite only were incorporated in the rubber.

The average grain size, and the grain size distribution, of the flame-retarding agents is not generally of critical importance. In unfoamed products, a relatively small average grain size of the order of 1.0 $\mu$ is normally preferred whereas in foamed products an average grain size in the range 3 – 150 $\mu$ is generally preferred.

The invention will be illustrated by the following non-limiting Example.

EXAMPLE

The method used for preparing a foamed rubber and the methods of testing are as follows:

PREPARATION OF FOAMED RUBBER

All the foamed rubbers were made using reagents and methods of preparation supplied by Revertex Co. Ltd. The basic formulation is shown below:

|  | Parts by weight |
| --- | --- |
| Rubber Latex - Revinex 34 D40 (Registered Trade Mark) | 178.6 * |
| Cure agent+ | 11 |
| Tetrasodium Pyrophosphate (T.S.P.P.) | 1 |
| Forming agent+ | 8 |
| Thickner solution | 10 |
| Water | 0 – 10 |
| Filler | 150 |

\* This represents 100 parts of latex on a dry basis. All weights are on this basis.
+ These are proprietary products. It is known that the cure agent contains a zinc compound, the foaming agent is a potassium oleate solution and the thickener solution comprises methyl cellulose or a similar cellulose derivative.

The cure is stirred slowly into the latex followed by the T.S.P.P. The filler is added and the rate of stirring is controlled to keep aeration to a minimum. When fully dispersed, the foaming agent and thickener solution are added. After addition of enough water to produce an acceptable viscosity, the mixture is transferred to the bowl of a household food mixer with a wire whisk, such as a Kenwood Chef mixer and whisked with the wire attachment until the required wet foam density is achieved. This is readily determined by weighing a known volume.

When the required density is reached, the mixer speed is reduced to a minimum for 5 minutes to refine the foam, i.e., to render the bubble size small and uniform. The foam is spread on hessian or a glass plate between machined side plates to control the thickness, skinned under infra red lamps for three minutes and then dried and cured in a hot air oven for 20 minutes at 140° C. Foams are allowed to condition for at least 48 hours at room temperature prior to testing.

TESTING OF FOAMED RUBBERS

Flammability Tests

The test used is the oxygen index determination given in ASTM (D 2863-70). The oxygen index is the minimum concentration of oxygen, expressed as volume per cent, in a mixture of oxygen and nitrogen which will support combustion.

Physical Tests

Physical testing of the foamed rubbers includes compression set, thickness and compression recovery tests as follows:

Compression Set — Compression set is the permanent deformation resulting from the application of compressive stress. Test pieces are cut from the foam and their thickness measured. The pieces are then compressed to half this thickness using accurately machined washers to maintain the calculated gap between flat, clamped plates. The apparatus is then placed in a hot air oven at 70°C for 22 hours. After this time the assembly is removed from the oven and the test pieces removed. The thickness is again measured after 30 minutes recovery at room temperature.

Thickness and Compression Recovery — Thickness of the foams under load is measured using a W.I.R.A. Carpet Thickness Gauge and a method based on B.S. 4098: 1967 which relates to carpets. The apparatus has a flat circular presser foot with an area of 1 square inch and under normal conditions exerts a pressure of 0.25 lbf/in$^2$. It is at this pressure that the base thickness of the foam is measured. By applications of weights, the thickness of the foam at 0.75, 3, 6, 9 and 12 lbf/in$^2$ can be measured.

The procedure is to increase the pressure stepwise to the maximum and then reduce it in similar steps until it is 0.25 lbf/in$^2$. A graph of the thickness against pressure is then plotted.

Thickness and compression recoveries can be calculated as follows:
If:
$t_o$ is the original thickness at 0.25 lbf/in$^2$ pressure
$t_c$ is the compressed thickness at 12 lbf/in$^2$ pressure
$t_R$ is the recovered thickness at 0.25 lbf/in$^2$ pressure after loading to 12 lbf/in$^2$ pressure The percentage thickness on recovery is:

$$100\ t_R/t_o$$

and the percentage compression recovery is:

$$t_R - t_c/t_o - t_c \times 100$$

The results obtained are shown in the table below

The above example relates to the use of Colemanite as a flame retardant filler in foamed rubbers, but the invention is not limited to such rubber products; it is equally applicable to compositions either of a foamed or solid (non-foamed) nature made from synthetic polymers such as polyvinyl chloride, polyolefines, polyurethanes, polyesters or polyester/polyamide systems and to solid rubber products.

The compositions of the invention are suitable for use in many products where flame-resistance is necessary or desirable, particularly in carpets and upholstery materials for use in buildings and in vehicles.

We claim:

1. A composition consisting essentially of rubber and a flame-retarding agent comprising an inorganic compound containing calcium and borate radicals in an amount sufficient to impart significant flame retardency to said composition.

2. A composition according to claim 1, in which the inorganic compound is a natural mineral comprising a hydrated salt.

3. A composition according to claim 2, in which the inorganic compound is colemanite.

4. A composition according to claim 2, in which the inorganic compound is selected from ulexite and pandermite.

5. A composition according to claim 1, in which said composition also contains a flame-retarding agent in addition to said compound.

6. A composition according to claim 5, in which said additional flame-retarding agent is selected from trihydrate of alumina and organic flame-retardant compounds containing bromine or chlorine.

7. A composition according to claim 1, which contains calcium carbonate as a filler.

8. A composition according to claim 1, which is unfoamed and in which the average grain diameter of said inorganic compound is about 1 micron.

TABLE

| FILLER AND LOADING Parts by weight per 100 parts dry rubber latex | | | OXYGEN INDEX % | COMP. SET % | COMP. RECOVERY % | THICKNESS RECOVERY % |
|---|---|---|---|---|---|---|
| COLEMANITE | TRIDYDRATE OF ALUMINA | CALCIUM CARBONATE | | | | |
| 150 | — | — | 29 | 5 | 94 | 95 |
| 100 | — | 50 | 26 | 9 | 80 | 91 |
| 75 | — | 75 | 25 | 9 | 82 | 91 |
| 50 | — | 100 | 25 | 9 | 90 | 95 |
| 75 | 75 | — | 31 | 10 | 90 | 95 |
| — | 150 | — | 30 | 11 | 92 | 96 |
| — | — | 150 | 23 | 7 | 88 | 93 |

It may be seen from the above results that foamed rubber products containing Colemanite as filler are substantially equal in mechanical and flame retardant properties to those containing an equal weight of trihydrate of alumina as filler. It also demonstrates that Colemanite may be used alone as the flame retardant filler or in admixture with calcium carbonate or trihydrate of alumina.

9. A composition according to claim 1, which is foamed and in which the inorganic compound has an average grain diameter from 3 to 150 microns.

10. Carpet and upholstery material, comprising a composition as claimed in claim 1 adhered to the undersurface of said carpet and upholstery material.

* * * * *

Notice of Adverse Decision in Interference

In Interference No. 99,548, involving Patent No. 3,865,760, F. Pitts and M. H. Clubley, FLAME RETARDANT MATERIALS, final judgment adverse to the patentees was rendered Apr. 10, 1978, as to claims 1–4 and 7–10.

[*Official Gazette August 8, 1978.*]